(12) United States Patent
Sayyah et al.

(10) Patent No.: US 6,906,309 B2
(45) Date of Patent: Jun. 14, 2005

(54) INJECTION-SEEDING OF A MULTI-TONE PHOTONIC OSCILLATOR

(75) Inventors: Keyvan Sayyah, Santa Monica, CA (US); Daniel Yap, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 42 days.

(21) Appl. No.: 10/116,799

(22) Filed: Apr. 5, 2002

(65) Prior Publication Data

US 2003/0089843 A1 May 15, 2003

Related U.S. Application Data

(60) Provisional application No. 60/332,371, filed on Nov. 15, 2001.

(51) Int. Cl.[7] .................................................. G01J 5/08
(52) U.S. Cl. .................. 250/227.11; 359/245; 359/278; 372/29.011; 372/32; 372/38.01
(58) Field of Search ................................ 372/20, 18, 25, 372/94, 29.01, 29.02, 38.01, 38.02, 28, 32, 700; 250/227.11, 227.12, 227.21, 227.27, 205, 214.1; 359/237, 245, 269, 278, 279, 322, 332; 398/101, 102, 91; 375/132; 385/3

(56) References Cited

U.S. PATENT DOCUMENTS

| | | | |
|---|---|---|---|
| 4,296,319 A | 10/1981 | Franks et al. | 250/227 |
| 5,383,198 A | 1/1995 | Pelouch et al. | 372/18 |
| 5,577,057 A | 11/1996 | Frisken | 372/18 |
| 5,723,856 A | 3/1998 | Yao et al. | 250/227.11 |
| 5,777,778 A | 7/1998 | Yao | 359/245 |
| 5,917,179 A | 6/1999 | Yao | 250/227.11 |
| 5,917,970 A | 6/1999 | Burns et al. | 385/24 |
| 5,929,430 A * | 7/1999 | Yao et al. | 250/205 |
| 6,388,787 B1 | 5/2002 | Bischoff | 359/187 |

FOREIGN PATENT DOCUMENTS

| | | |
|---|---|---|
| WO | 00/45213 A1 | 8/2000 |
| WO | 01/80507 | 10/2001 |

OTHER PUBLICATIONS

Bilodeau, F., et al., "An All–Fiber Dense–Wavelength–Division Multiplexer/Demultiplexer Using Photoimprinted Bragg Gratings," IEEE Photonics Technology Letters, vol. 7, No. 4, pp 388–390 (Apr. 1995).

Bennett, S., et al., "1.8–THz Bandwidth, Zero–Frequency Error, Tunable Optical Comb Generator for DWDM Applications," IEEE Photonics Technology Letters, vol. 11, No. 5, pp 551–553 (May 1999).

Chu, S., et al., "An Eight–Channel Add–Drop Filter Using Vertically Coupled Microring Resonators over a Cross Grid," IEEE Journal of Technology Letters, vol. 11, No. 6, pp 691–693 (Jun. 1999).

(Continued)

Primary Examiner—Thanh X. Luu
Assistant Examiner—Stephen Yam
(74) Attorney, Agent, or Firm—Ladas & Parry (57) ABSTRACT

A multi-tone photonic oscillator comprises a laser; an optical modulator coupled to the laser; and a delay line and a photodetector coupled to the optical modulator for generating a delayed electrical signal representation of the output of the optical modulator; wherein the optical modulator being responsible for the delayed electrical signal for generating multiple tones where the frequency intervals of the tones is a function of the amount of delay imposed by the delay line.

18 Claims, 5 Drawing Sheets

OTHER PUBLICATIONS

Haus, H., et al., "Narrow–Band Optical Channel–Dropping Filter," *Journal of Lightwave Technology,* vol. 10, No. 1, pp 57–61 (Jan. 1992).

Kazarinov, R., et al., "Narrow–Band Resonant Optical Reflectors and Resonant Optical Transformers for Laser Stabilization and Wavelength Division Multiplexing," *IEEE Journal of Quantum Electronics,* vol. QE–23, No. 9, pp 1419–1425 (Sep. 1987).

Little, B. E., et al., "Wavelength Switching and Routing Using Absorption and Resonance," *IEEE Photonics Technology Letters,* vol. 10, No. 6, pp 816–818 (Jun. 1998).

Yao, X.S., "Multiloop Optoelectronic Oscillator," *IEEE Journal of Quantum Electronics,* vol. 36, No. 1, pp 79–84 (Jan. 2000).

Yao, X.S., et al., "Optoelectronic Oscillator for Photonic Systems," *IEEE Journal of Quantum Electronics,* vol. 32, No. 7, pp 1141–1149 (Jul. 1996).

Abstract of JP 07–264136, *Patent Abstracts of Japan,* vol. 1996, No. 2 (Feb. 1996).

Yamamoto, T., et al., "270–360 Ghz Tunable Beat Signal Light Generator For Photonic Local Oscillator," *Electronics Letters,* vol. 38, No. 15, pp. 795–797 (Jul. 2002).

Yao, X.S., et al., "High Frequency Optical Subcarrier Generator," *Electronics Letters,* vol. 30, No. 18, pp 1525–1526 (Sep. 1, 2994).

Yao, X.S., et al., "Optoelectronic Oscillator for Photonic Systems," *IEEE Journal of Quantum Electronics,* vol. 32, No. 7, pp 1141–1149 (Jul. 1996).

* cited by examiner

INJECTION-SEEDING OF A MULTI-TONE PHOTONIC OSCILLATOR

CROSS REFERENCE TO RELATED APPLICATIONS

This application claims the benefit of U.S. provisional application No. 60/332,371 filed Nov. 15, 2001 for an "Injection-seeding of a Multi-tone Photonic Oscillator" by Daniel Yap and Keyvan Sayyah, the disclosure of which is hereby incorporated herein by reference.

This application is related to a patent application entitled "Agile RF-Lightwave Waveform Synthesis and an Optical Multi-Tone Amplitude Modulator" bearing serial No. 60/332,367 and filed Nov. 15, 2001, and its corresponding non-provisional application bearing Ser. No. 10/116,801 and filed on the same date as the present application, the disclosures of which are hereby incorporated herein by this reference. These related applications are owned by the assignee of this present application.

This application is related to a provisional patent application entitled "Agile Spread Waveform Generator" bearing serial No. 60/332,372 and filed Nov. 15, 2001, and its corresponding non-provisional application bearing Ser. No. 10/116,829 and filed on the same date as the present application, the disclosures of which are hereby incorporated herein by this reference. These related applications are owned by the assignee of this present application.

This application is also related to a patent application entitled "Remotely Locatable RF Power Amplification System" bearing serial No. 60/332,368 and filed Nov. 15, 2001, and its corresponding non-provisional application bearing Ser. No. 10/116,854 and filed on the same date as the present application, the disclosures of which are hereby incorporated herein by this reference. These related applications are owned by the assignee of this present application.

TECHNICAL FIELD

This invention relates to a method and apparatus for the generation of multitone RF lightwave oscillations using a photonic oscillator by temporarily injecting a RF electrical signal, either directly or by means of a lightwave signal, into a photonic oscillator at the vicinity of its main oscillation tone to excite other oscillation tones of the oscillator which may have been suppressed due to phase dispersions in its feedback loop. Once the multitone oscillations have been established, the electrical injection or seeding signal may be removed while still retaining these tones.

BACKGROUND OF THE INVENTION

The disclosed multitone photonic oscillator is a very useful device for generating a set of RF tones with low phase noise and controlled tone spacing. It is a very compact device that can be used in a variety of RF photonics and wireless applications requiring a number of simultaneous carriers. Previous means for generating such low phase noise multitone carriers with controllable frequency intervals typically required a set of low phase noise RF synthesizers that are both bulky and expensive.

The generation of low phase noise multitone RF carriers is essential in a variety of radar and communications applications. Low Probability of Intercept (LPI) radar and communication systems use a set of rapidly frequency shifted low phase noise RF carriers as transmit waveforms in order to spread the information spectrum and hence reduce the probability of intercept. The presently disclosed device would be quite useful in such an application.

The disclosed multitone photonic oscillator can also be used as a source of low phase noise carriers in commercial wireless or radio on fiber applications. In these applications, the use of a compact multi-tone carrier generator for the frequency multiplexed wireless transmission of information could significantly reduce the size and cost of the currently used bank of RF carrier synthesizers.

Most prior art optoelectronic oscillators only generate a single tone. A photonic oscillator is disclosed by U.S. Pat. No. 5,723,856 and by a related article by S. Yao and L. Maleki, IEEE J. Quantum Electronics, v. 32, n.7, pp. 1141–1149, 1996. In this patent and the related article, a photonic oscillator is disclosed (called an optoelectronic oscillator by the inventors) which includes a modulator, an optical feedback loop, a filter and a photodetector. The aforementioned paper reports the generation of multiple tones achieved by enlarging the bandwidth of the filter and injection locking the oscillator to a continuously applied external RF signal. The spacing of the tones in this case is equal to the frequency of the injected signal. This method causes all of the oscillator modes (one tone per mode) to oscillate in phase. As a result the output signal is a series of pulses.

The present invention includes a modulator, an optical feedback loop, and a photodetector similar to the prior art. However, the present invention is different in that electrical injection locking is not used. Rather, injection seeding is used (to help initiate the generation of multiple tones) and the tone spacing is determined by the delay time of the optoelectronic feedback loop.

There are significant differences between the present invention described herein and this prior art:

1. In the present invention, the tone spacing of the multi-tone oscillations is not determined by the injection seeding RF signal (which may be applied only temporarily), but rather by the delay time of the optoelectronic feedback loop. In this prior art, the tone spacing is fixed and locked by the permanently injected signal.
2. In the present invention an injection seeding RF signal is injected into the oscillator in order to help excite a multitude of oscillation modes that have been suppressed due to the phase dispersion in the feedback loop by fine tuning their electrical phase. Once multi-tone oscillations have been established, the injection seeding RF signal may be removed and the oscillations are maintained. In the prior art, the external RF signal is permanently injected to lock the frequency interval of the oscillation modes. The prior art does not consider removal of the injection locking signal.
3. In contrast to this prior art in which the multiple tones are phase locked due to the injection locking signal hence resulting in a pulsed waveform in the time domain, the multi-tones of the present invention need not be non coherent. Thus, the output waveform is continuous in time.

BRIEF DESCRIPTION OF THE INVENTION

In one aspect, the present invention provides a multi-tone photonic oscillator comprising a laser; an optical modulator coupled to the laser; a delay line and a photodetector coupled to the optical modulator for generating a delayed electrical signal representation of the output of the optical modulator; wherein the optical modulator is responsible for the delayed electrical signal for generating multiple tones where the frequency intervals of the multiple tones is a function of the amount of delay imposed by the delay line rather than being injection locked.

In another aspect, the present invention provides a method of generating a multitone RF lightwave comprising: a circulating laser supplied optical signal in closed loop, the loop including an optical modulator coupled to the laser; a delay line coupled to the optical modulator for generating a delayed electrical signal representation of the output of the optical modulator; and triggering multi-tone oscillators in said loop by momentarily injecting a RF signal into said loop.

In yet another aspect, the present invention provides a method of generating a multitone RF lightwave comprising: circulating laser supplied optical signal in closed loop, the loop including an optical modulator coupled to the laser; a delay line coupled to the optical modulator for generating a delayed electrical signal representation of the output of the optical modulator; and triggering multi-tone oscillators in said loop by adjusting the phase delay of the loop.

DETAILED DESCRIPTION

Figure 1A:
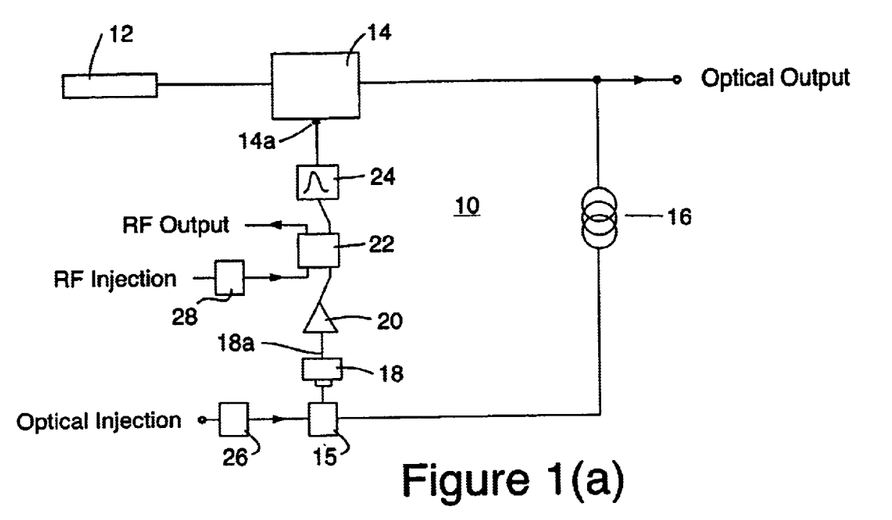
FIG. 1(a) is a block diagram of a multi-tone photonic oscillator in accordance with the present invention.

A detailed block diagram of the multi-tone photonic oscillator 10 is shown in FIG. 1(a) which includes a laser 12, an optical modulator 14 and a feedback loop. The feedback loop includes a lightwave delay path 16, a photodetector 18, a low-noise electrical amplifier (LNA) 20, a coupler 22 or a coupler 15 and a RF bandpass filter 24. The laser light, which supplies the power for the oscillator, is modulated by the RF signal at the electrical input 14a of the optical modulator 14. The modulated lightwave is sensed by the photodetector 18, whose electrical output 18a is fed back to the modulator 14 following amplification by LNA 20 and bandpass filtering by filter 24. The bandpass filter 24 sets the bandwidth of the generated RF multitone comb spectrum.

The operating principal of the multi-tone oscillator is as follows. Random noise generated in the feedback loop modulates the laser light, which after propagating through the optical delay path 16 and being photodected by detector 18 is regeneratively fed back to the modulator 14. This constitutes a positive feedback if the open loop gain of the oscillator is greater than one. This amplification of the noise signal as a result of positive feedback occurs at frequency intervals ($\Delta f$) equal to an integer multiple of the inverse of the loop delay time ($\tau$); $\Delta f = k/\tau$, where k is an integer. This results in potential multi-tone oscillations at the above frequency intervals. The delay loop also acts as a storage medium to increase the quality factor (Q) of the multi-mode oscillator which is proportional to the square of the loop's delay ($Q = 2\pi f \tau 2/\delta$), where $f$ is the oscillation frequency, and $\delta$ is the input noise-to-signal ratio of the oscillator. Thus, the oscillator phase noise $S(f')$, which is inversely proportional to this quality factor $S(f') = \delta/[(2\pi)^2(\tau f')^2]$ where $f'$ is the offset frequency, decreases quadratically as the optical delay in the loop is increased.

Figure 2:
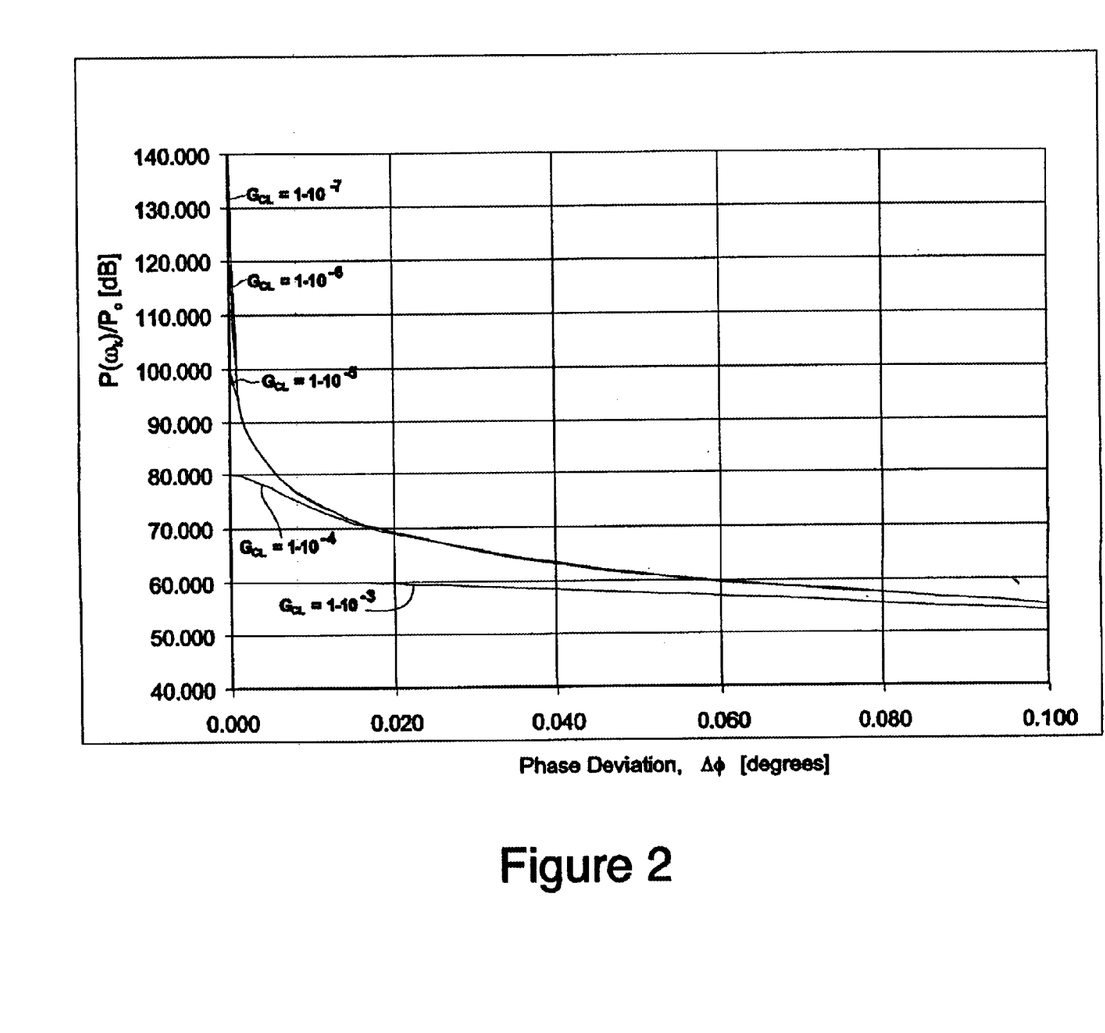
FIG. 2 is a graph of the calculated dependence of normalized power of the photonic oscillator tones on the loop phase deviation from its nominal value as a function of several closed loop gain values.

It has been experimentally observed that multi-tone oscillations are not always present when the photonic oscillator is turned on. In some occasions, only a predominant single tone is present although the overall passband and the open loop gain of the feedback loop allows the other oscillations tones with a tone spacing of $\Delta f = k/\tau$, as described above. One possible explanation for the lack of excitation of the other multi-tones is the phase dispersion present in the feedback loop at the time the photonic oscillator is turned on. The power spectrum of the oscillation tones in the photonic oscillator is given below as:

$$P(\omega_k) = P_o[1 + G^2 - 2G \cos[\omega_k \tau + \phi(\omega_k)]] \quad (1)$$

Where $P(\omega_k)$ is the output power of each tone at a frequency of $\omega_k$, $P_o$ is the input noise power resulting in the oscillations, G is the closed loop gain of the oscillator, $\tau$ is the loop delay time and $\phi(\omega_k)$ is the total phase shift that each tone experiences in the feedback loop. The dependence of the normalized oscillation power $P(\omega_k)/P_o$ on the deviations of the phase shift from it nominal value is shown in FIG. 2 for several values of the closed loop gain. The nominal value of the phase shift results in the argument of the cosine term in Eq. (1) above to be an integer multiple of $2\pi$, resulting in maximum oscillation power. It is clear from this figure that for close loop gain values very close to one ($1-10^{-5}$ to $1-10^{-7}$), which are very reasonable values as discussed below, the normalized oscillation power drops at least 5 orders or magnitude (–50 dB) with a phase deviation of up to 0.1° from the theoretical value which results in maximum oscillation power. This calculation demonstrates that a very small phase deviation from the optimum value results in a significant suppression of the output power in the oscillation tones.

The closed loop gain of the photonic oscillator is given by the following relationship:

$$G_{CL} = 1 - \rho_N G_A^2/(\tau P_{osc}) \quad (2)$$

Where $G_{CL}$ is the closed loop gain, $\rho_N$ is the output noise power density, $G_A$ is the voltage gain of the amplifier in the feedback loop, $\tau$ is the loop delay time and $P_{osc}$ is the peak oscillation power. For typical values of $P_{osc} \sim 10$ mW(10 dBm), $P_{osc} \sim 10$ mW(10 dBm), $G_A \sim 10$, and $\tau \sim 10^6$s, the closed loop gain of the photonic oscillator is $G_{CL} \sim 1 - 10^{-10}$. In the calculations shown above for the sensitivity of the output power of each tone of the oscillator on phase deviations shown above, closed loop gains in the range of $1 - 10^{-5}$ to $1 - 10^{-7}$ have been estimated which result in a less sensitive phase deviation dependence compared to the value of $1 - 10^{-10}$ estimated here. Thus, the prediction made above that the oscillation power drops by at least 5 orders of magnitude drop with a phase deviation of up to only 0.1° from optimum values is justified.

In practice, the photonic oscillator in some occasions operates in a single predominant tone after turn on and not in a multi-tone mode as expected. By inserting either an electrical seeding signal (via an electronic coupler 22) or an optical seeding signal (via an optical coupler 15), the generation of multi-tones can be initiated. If optical seeding is used, the electronic coupler 22 is optional. On the other hand, if electrical seeding is used, the optical coupler 15 is optional.

After the tones are initiated (typically in a fraction of a second), the seeding signal may be turned off. If an optical seeding signal is used, it may be conveniently injected for a short period of time by momentarily closing an optical switch 26 at an input of the optical coupler 15. If instead an electrical seeding signal is used, it may be conveniently injected for a short period of time by momentarily closing an electronic switch 28 at the input to the electronic coupler 22. A RF output signal of the photonic oscillator is available in electronic form at an output of the coupler 22 and a RF signal in optical form is available at the output of the optical modulator 14.

Figure 1B:
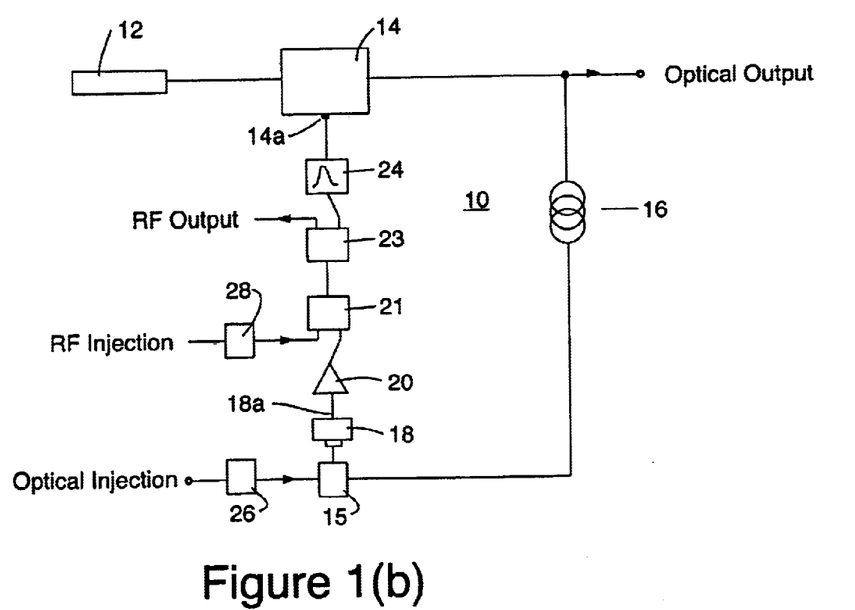
FIG. 1(b) is a block diagram of another embodiment of a multi-tone photonic oscillator in accordance with the present invention.

The embodiment of FIG. 1(b) is quite similar to that of FIG. 1(a). In FIG. 1(b) the function of coupler 22 of FIG. 1(a) is assumed by an electronic combiner 21 and an optional splitter 23. In this embodiment the electrical seeding signal may be conveniently injected for a short period of time by momentarily closing an electronic switch 28 at the input to the electronic combiner 21. A RF output signal is available in electronic form at an output of splitter 23 and a RF signal in optical form is available at the output of the optical modulator 14.

Figure 1C:
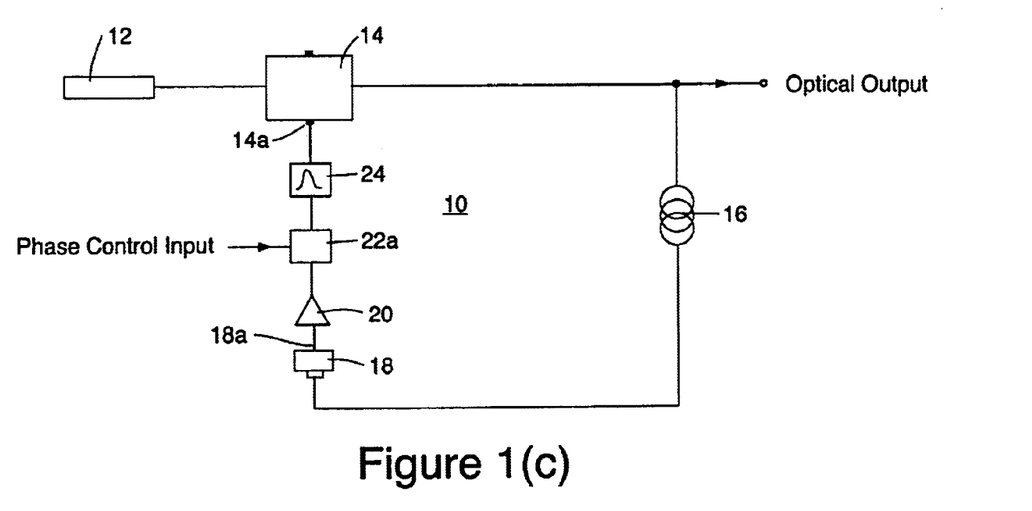
FIG. 1(c) is a block diagram of yet another embodiment of a multi-tone photonic oscillator in accordance with the present invention.

Turning now to the embodiment of FIG. 1(c), by inserting an optional electrical phase shifter 22a in the feedback loop and adjusting the phase value thereof, multi-tones that were not previously present can be excited. This qualitatively confirms the above discussion that the excitation of the multi-modes is phase sensitive. In fact, when the photonic oscillator operates in a single predominant tone, the other tones are still present but at much suppressed power of 50–60 dB below the single tone.

The otherwise suppressed multi-tones can be excited by injecting a temporary RF seeding signal into the photonic oscillator 10 as has been discussed with reference to the embodiments of FIGS. 1(a) and 1(b). The injected signal can be an electronic RF signal or an optic RF signal, as desired. The effect of this RF signal is equivalent to that of the electrical phase shifter 22a in the feedback loop as discussed with reference to the embodiment of FIG. 1(c).

Figure 1D:
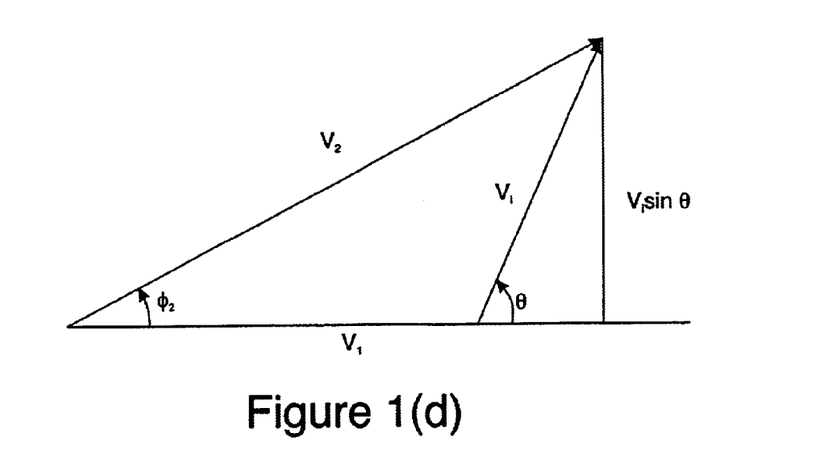
FIG. 1(d) is a phaser diagram of the injection-seeding signal ($V_i$), the amplifier output signal ($V_1$) and the resulting filter input signal ($V_2$)

FIG. 1(d) is a phaser diagram showing the relationship between the magnitude and phase angle of the signals at the output of the amplifier ($V_1$), the input of the filter ($V_2$), and the injected signal ($V_i$). In a phaser relationship, $V_2 = V_1 + V_i$. From the phaser diagram of FIG. 1(b), it can be readily shown that $V_2$ is phase shifted from $V_1$ by the following relationship:

$$\phi_2 \sim \tan^{-1}[(V_i \sin \theta)/V_1]$$

Where $\phi_2$ is the induced phase shift between the signals at the input of the filter ($V_2$) and the output of the amplifier ($V_1$), and $\theta$ is the phase shift of the amplifier output signal relative to the injected signal ($V_i$). The above relationship is true for small injected signals ($V_i << V_1$). Thus, the injected RF signal induces a phase shift in the feedback loop of the photonic oscillator proportional to the magnitude of this signal that is enough to phase tune a number of tones in the oscillator, and hence excite their oscillation. In the absence of injection ($\phi_2 = 0$) the signals at the output of the amplifier and the input of the filter become the same.

Figure 3A:
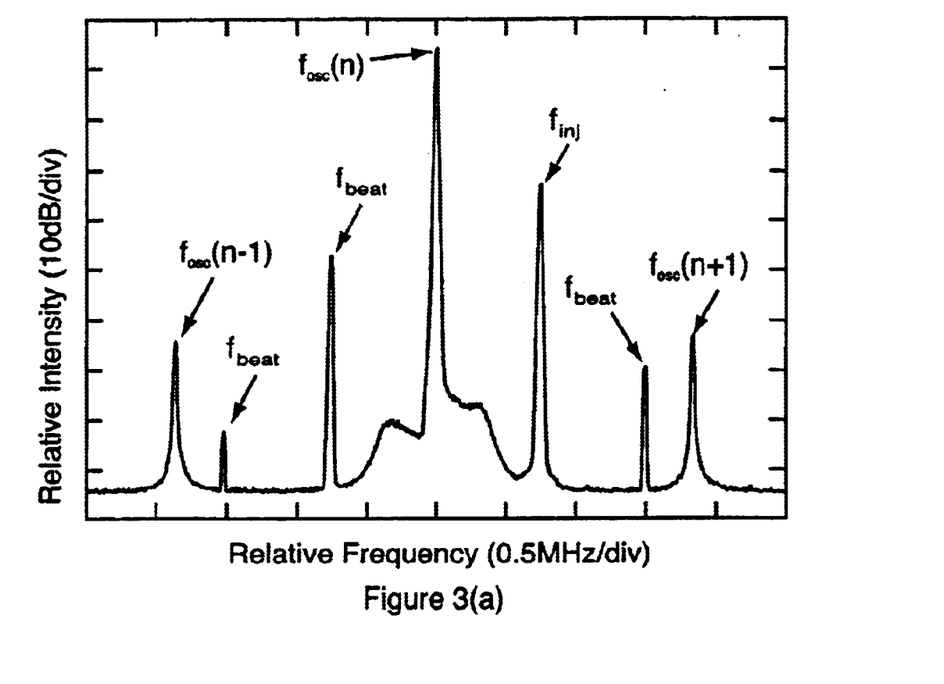
FIGS. 3(a)–3(d) are graphs of a succession of RF spectra demonstrating the effect of injection seeding.
Figure 3B:
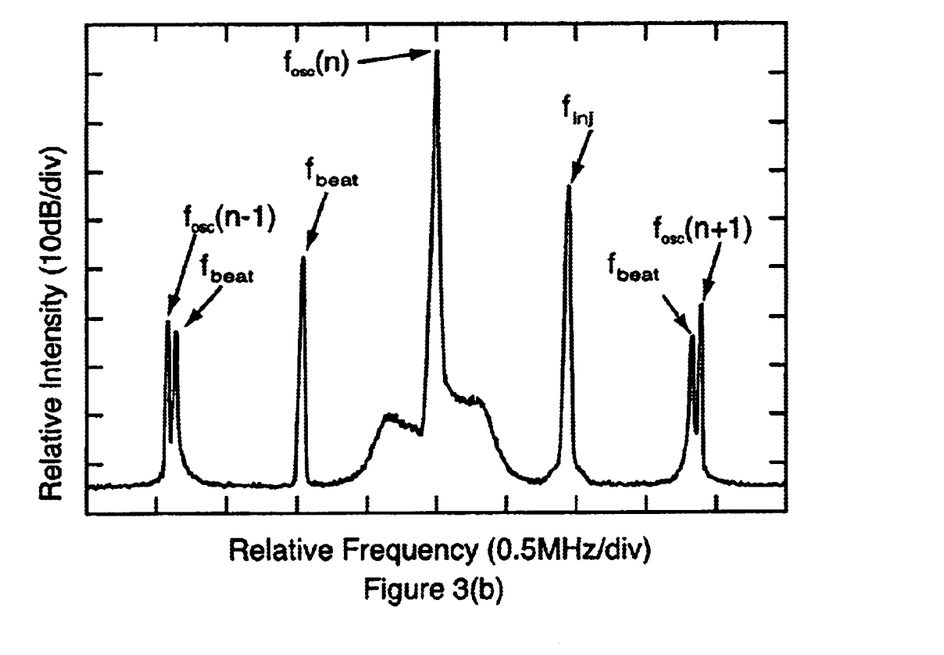
Figure 3C:
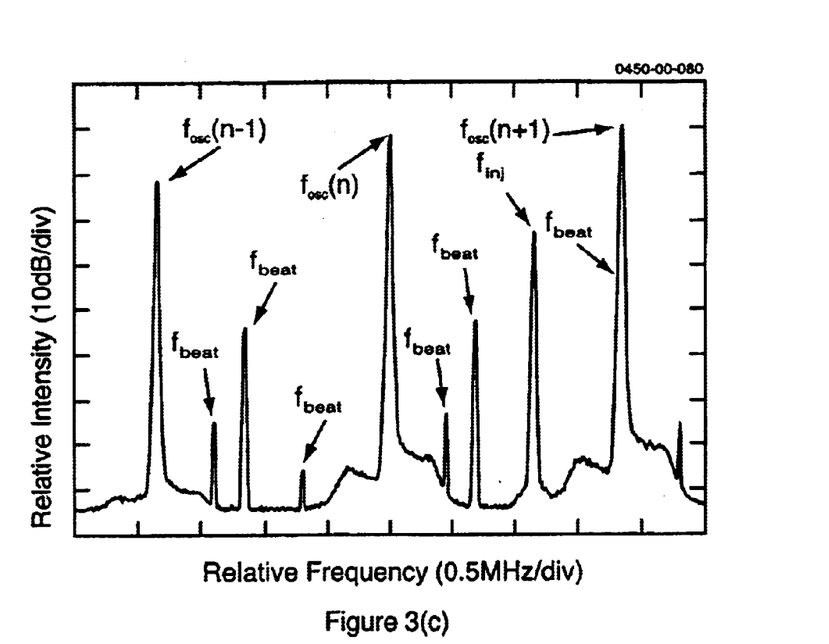
Figure 3D:
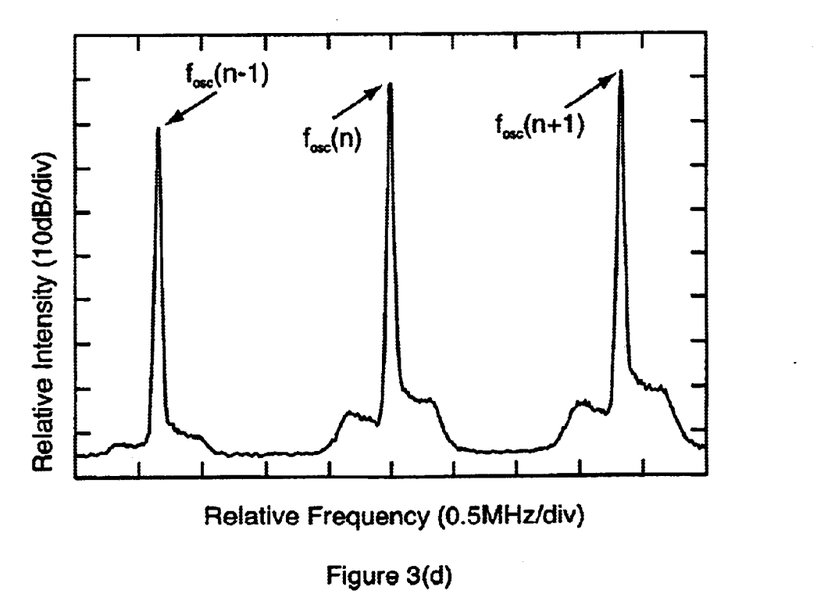

FIGS. 3(a)–3(d) show a succession of RF spectra demonstrating the effect of the RF seeding signal in exciting the oscillation tones adjacent to the single dominant tone. FIG. 3(a) shows a main oscillation tone of about 15 dBm at a frequency of about 4.1636 GHz and two suppressed tones (~60 dB) separated about 1.8 MHz from this tone at the two extremes of the spectrum. Also shown in this spectrum are the injected signal (−12 dBm) at about 0.7 MHz above the main tone and other weaker mixing signals between the injecting signal and the main tone. FIG. 3(b) shows the same spectrum except for a slight increase in the injection signal frequency. FIG. 3(c) shows that a further increase in the frequency of the injection signal results in a strong excitation of the 2 oscillator modes mentioned above in which these tones acquire power levels of about 10 and 0 dBm while the power level of the previously predominant tone decreases to below 10 dBm. This indicates that the overall output power of the photonic oscillator is now shared among many tones, hence decreasing the power level of the previously predominant tone. FIG. 3(d) shows the same condition as in FIG. 3(c) with the exception that the injected seeding signal is completely removed while the three oscillation tones are still maintained. The succession of these figures demonstrate the key point of this invention.

It has been found that this technique requires spanning the frequency of the injection signal in the vicinity of the predominant tone between the adjacent and suppressed oscillation tones. The excitation of these suppressed tones occurs at an injection seeding frequency where the frequency dependent phase changes resulting from the RF injection process are sufficient to correct for any potential phase deviation due to phase dispersion in the feedback loop. As shown in FIG. 2, a very small phase deviation of up to 0.1° can result in more than 50 dB suppression in the power level of the oscillation tones. Once this excitation of the oscillation tones as a result of their fine phase tuning occurs, the removal of the RF seeding signal does not result in a renewed suppression of the tones just excited. This indicates that this process is not reversible and once the tones are excited by their phase adjustment they are locked in and the removal of the phase change inducing mechanism does not affect them.

For a practical implementation of this technique, a RF seeding signal is injected into a photonic oscillator at a frequency of the first suppressed tone adjacent and below the single predominant tone. The injection signal is then spanned in frequency up to the second suppressed tone adjacent and above the predominant tone and the power level of one of the suppressed tones continuously monitored. Once this power level jumps above 5–6 orders of magnitude, the frequency spanning is stopped and the RF injection-seeding signal is removed. At this point, multi-tone oscillations in the photonic oscillator have been excited.

Finally, another advantage of this invention is in the remote optical injection seeding of the photonic oscillator in order to excite multi-tone oscillations. This can be accomplished by first modulating an optical carrier with the injection-seeding RF signal remotely, and then transporting this RF-lightwave signal to the optical coupler 15 that feeds the photodetector 18 in the feedback loop of the photonic oscillator 10 as shown in FIG. 1(a).

The amplifier 20 is an electronic amplifier in the embodiments of FIGS. 1(a)–1(c). Alternatively, an optical amplifier could be utilized.

Having described the invention in connection with a preferred embodiment therefore, modification will now certainly suggest itself to those skilled in the art. As such the invention is not to be limited to the disclosed embodiments except as required by the appended claims.

What is claimed is:

1. A multi-tone photonic oscillator comprising:
   (a) a laser;
   (b) an optical modulator coupled to the laser;
   (c) a delay line and a photodetector coupled to the optical modulator for generating a delayed electrical signal representation of a signal output from the optical modulator, the delay line and the photodetector forming a portion of a feedback loop; and
   (d) an RF injection port for momentarily injecting RF energy into said feedback loop, the RF energy being frequency swept at least until multi-tone oscillation is initiated by the oscillator, the multi-tone oscillation having tones whose frequency intervals are a function of the delay imposed by the delay line.

2. The multi-tone photonic oscillator of claim 1 wherein the feedback loop also includes an amplifier to ensure that the feedback loop has an open loop gain greater than unity.

3. The multi-tone photonic oscillator of claim 1 wherein the momentarily injected RF energy occurs at frequencies which do not correspond to the tones generated by the optical modulator.

4. The multi-tone photonic oscillator of claim 3 wherein the RF injection port is an optical coupler.

5. The multi-tone photonic oscillator of claim 3 wherein the RF injection port is an electronic coupler.

6. The multi-tone photonic oscillator of claim 3 wherein the RF injection port is an electronic combiner.

7. The multi-tone photonic oscillator of claim 2 further including a phase shifter for adjusting phase delay in said feedback loop to thereby excite otherwise suppressed multiple tones.

8. The multi-tone photonic oscillator according to claim 1 further including a switch for momentarily coupling the RF energy to the RF injection port.

9. The multi-tone photonic oscillator according to claim 8 wherein the switch is an optical switch.

10. The multi-tone photonic oscillator according to claim 8 wherein the switch is an electronic switch.

11. A method of generating a RF lightwave having multiple tones, the method comprising:
    circulating a laser injected optical signal in a closed loop, the loop including an optical modulator coupled to a laser, a delay line coupled to the optical modulator for generating a delayed electrical signal representation of a signal output by the optical modulator; and
    triggering multiple tone oscillations in said loop by momentarily injecting a RF signal into said loop, the RF signal being frequency spanned until multi-tone oscillations are initiated, after which the RF signal is disconnected from said loop while said multi-tone oscillations continue.

12. The method of generating a RF lightwave having multiple tones according to claim 11 further including a step of adjusting the delay imposed by the delay line as a function of desired frequency intervals of the tones in the RF lightwave.

13. The method of generating a RF lightwave having multiple tones according to claim 11 further including adjusting the frequency of the momentarily injected RF signal to vary between two frequencies, said two frequencies being located between an adjacent two of the multiple tones.

14. The method according to claim 11 wherein the RF energy is momentarily injected into said loop by momentarily closing a switch coupled to the RF injection port.

15. The method according to claim 14 wherein the switch is an optical switch.

16. The method according to claim 14 wherein the switch is an electronic switch.

17. A method of generating a multitone RF lightwave having multiple tones, the method comprising:
    circulating a laser injected optical signal in a closed loop having a phase delay, the loop including an optical modulator coupled to a laser, a delay line coupled to the optical modulator for generating a delayed electrical signal representation of a signal output by the optical modulator, a single tone being initially generated in said loop; and
    triggering multi-tone oscillations in said loop by adjusting the phase delay of said loop when said single tone oscillation otherwise occurs in said loop.

18. The method of generating a multitone RF lightwave according to claim 17 further including a step of adjusting the delay imposed by the delay line as a function of desired frequency intervals of the tones in the multitone RF lightwave.

* * * * *